No. 896,352. PATENTED AUG. 18, 1908.
J. C. BOWE.
COMBINED SIFTER AND STRAINER.
APPLICATION FILED DEC. 31, 1907.
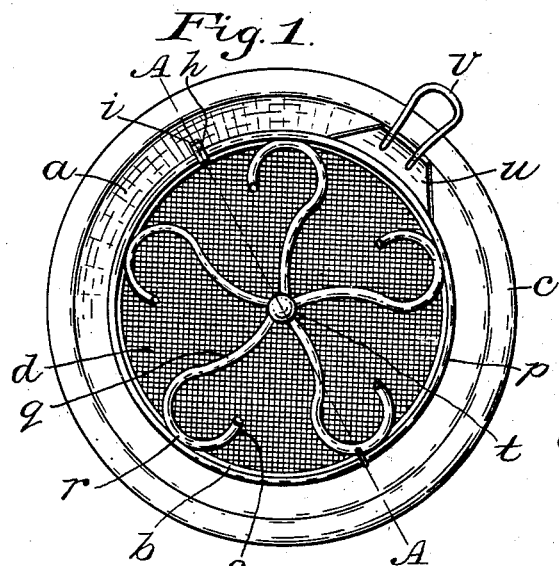
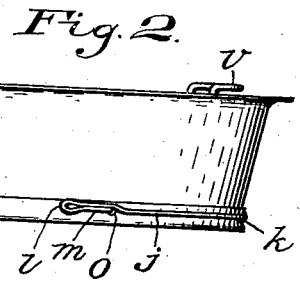
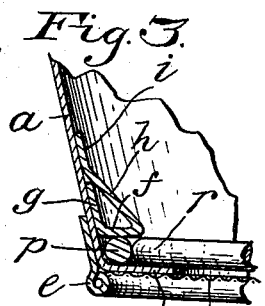
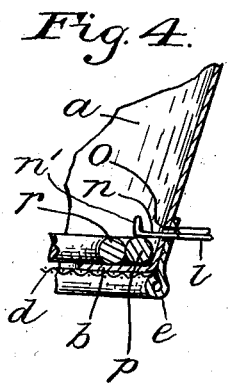
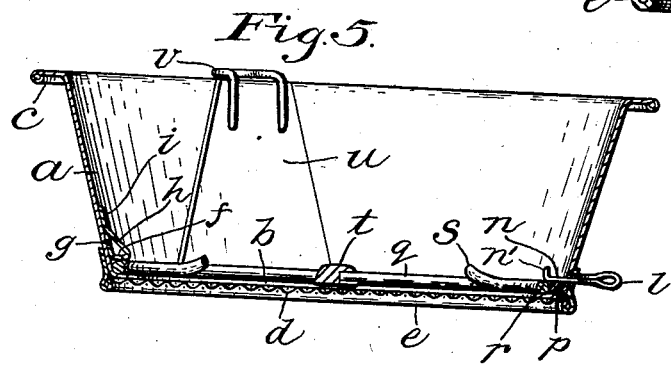
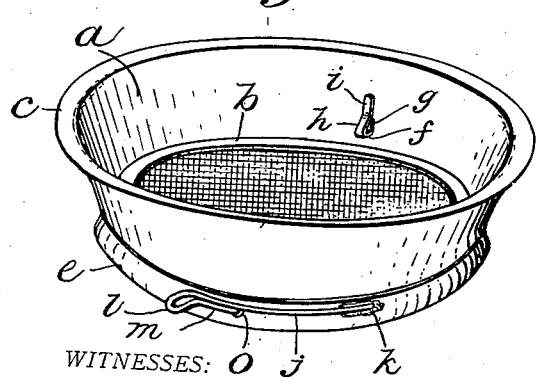
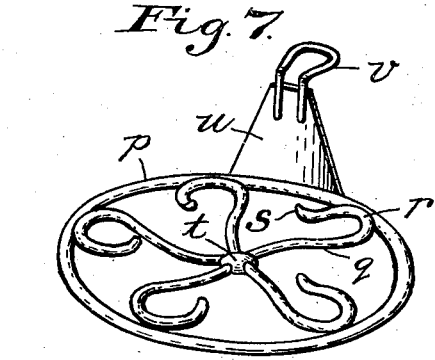
WITNESSES:
J. H. Gardner
M. D. Beaty
INVENTOR:
James C. Bowe,
BY E. T. Silvius.
ATTORNEY.

UNITED STATES PATENT OFFICE.

JAMES C. BOWE, OF INDIANAPOLIS, INDIANA, ASSIGNOR OF ONE-HALF TO LOUIS P. CORNET, OF INDIANAPOLIS, INDIANA.

COMBINED SIFTER AND STRAINER

No. 896,352.　　　Specification of Letters Patent.　　　Patented Aug. 18, 1908.

Application filed December 31, 1907. Serial No. 408,794.

*To all whom it may concern:*

Be it known that I, JAMES C. BOWE, a citizen of the United States, residing at Indianapolis, in the county of Marion and State of Indiana, have invented certain new and useful Improvements in a Combined Sifter and Strainer; and I do declare the following to be a full, clear, and exact description of the invention, reference being had to the accompanying drawings, and to the letters and figures of reference marked thereon, which form a part of this specification.

This invention relates to culinary utensils and especially to a utensil whereby flour, meal or other substances may be quickly and thoroughly sifted, which utensil may be quickly adapted to be used as a plain strainer, the invention relating particularly to the vessel from which the substances are to be sifted or strained and to the agitator for agitating flour or meal while being sifted so as to prevent its packing in the vessel.

Objects of the invention are to provide an improved combined sifter and strainer which may be quickly changed so as to adapt it either for sifting purposes or for straining purposes; to provide an improved utensil of the above-mentioned character which may be constructed at relatively small expense and be durable, convenient and economical in use, a further object being to provide an article of this character which may be adapted to be nested for shipment, so as to occupy the minimum amount of space.

With the above-mentioned and minor objects in view, the invention consists in an improved combined sifter and strainer comprising a vessel of pan shaped form having a foraminous or reticulated or wire-cloth bottom, and an agitator having a handle and provided with a guide plate adapted to engage the side of the vessel, the agitator operating upon a guide upon the bottom of the vessel, said vessel having novel features of construction, and the agitator having upward extending projections for loosening the substances that may have a tendency to pack in the vessel. And the invention consists further in the parts and combinations and arrangements of parts as hereinafter particularly described and defined in the appended claims.

Referring to the drawings Figure 1 is a top plan of the complete sifter and strainer constructed substantially in accordance with the invention; Fig. 2, a side elevation thereof; Figs. 3 and 4, fragmentary sectional views approximately on the line A A in Fig. 1; Fig. 5, a vertical sectional view of a complete article on the line A A in Fig. 1; Fig. 6, a perspective view of the vessel; and, Fig. 7, a perspective view of the agitator.

Similar reference characters in the various figures of the drawings designate like elements or features of construction.

In a practical embodiment of the invention, a pan-shaped vessel is provided which preferably is formed of pressed tin plate or similar material, and has an annular side $a$ tapering so that the top of the vessel is greater in diameter than the bottom thereof, the bottom portion of the side having an inwardly extending ledge forming an annular guide plate $b$ which may be suitably formed of an inturned portion of the side $a$, the top of the side having an external annular flange $c$. A reticulated or wire-cloth bottom $d$ is attached against the under side of the ledge or guide, and the lower portion of the side $a$ is provided with a bottom ring $e$ that extends below the plane of the bottom $d$ and serves as a stand for the vessel. One portion of the side $a$ supports a guide $f$ that is arranged slightly above the guide $b$, and is preferably provided with a flange $g$ secured to the inner side of the side $a$, and the guide $f$ preferably is reinforced by a brace $h$ extending from the extremity thereof and having a lip $i$ secured to the side $a$ above the flange $g$. Approximately opposite to the guide $f$ is a device serving both as a guide opposite to the guide $b$ and also as a latch for retaining the agitator in the vessel, the device preferably comprising a spring arm $j$ secured by solder $k$ to the exterior of the ring $e$, the arm being bent to form a loop shaped finger hold $l$ from which extends a short arm $m$ having a projection $n$ that extends through an aperture $o$ in the ring $e$ and the side $a$ above the guide $b$, the projection having an upturned part $n'$ to prevent the projection $n$ from being withdrawn through the aperture.

The improved agitator comprises preferably an annular frame $p$ adapted to rotate on the guide $b$ beneath the guide $f$ and the projection $n$, a suitable number of arms $q$ radiating from a central point within the compass of the frame and having crooks $r$ suitably joined to the frame, the crooks having upturned ends $s$ for loosening the flour or meal to prevent packing thereof on the bottom of the vessel. The arms are connected together preferably by solder t. The frame is provided at one side thereof with a guide plate u which may be composed of any suitable material adapted to present considerable bearing surface against the inner side of the side a of the vessel, the top of the guide plate having a loop shaped handle v thereon that extends over and outwardly beyond the flange c of the vessel, so that the loop may be used for hanging up the vessel with the agitator therein, and also be used for operating the agitator.

The agitator may suitably be composed of wire, but it will be obvious that it may be formed of any other suitable material.

In practical use, the projection n should be drawn outwardly by means of the finger-hold l in order to either insert the agitator in the vessel or to remove it therefrom. When removed, the vessel may be used in the usual way as a strainer, and in some cases may be used alone for sifting purposes, and when it is desirable to use an agitator, the improved agitator may readily be placed in position and should be operated by means of the handle v which may be moved forward and backward, and the guide plate u sliding against the smooth side a will serve to prevent the frame p from binding and will rotate smoothly as though it were pivoted at the middle of the bottom, the frame p sliding smoothly on the guide b. The plate u will travel only between the guide f and the projection n. After using the utensil, any remaining substance therein may be readily poured out even without requiring the removal of the agitator, and all parts may be readily cleansed when required.

Having thus described the invention, what is claimed as new is—

1. In a sifter or strainer, the combination of a vessel having an internal annular guide connected to its side, a foraminous bottom supported under the guide, a fixed guide on the side of the vessel above the annular guide, and a movable guide mounted on the side of the vessel above the annular guide, with an agitator to be mounted removably on the annular guide under the fixed and movable guides.

2. In a sifter or strainer, the combination of a vessel having an internal annular guide connected to its side, a foraminous bottom supported under the guide, a fixed guide on the side of the vessel above the annular guide, and a movable guide mounted on the exterior of the side of the vessel and extending through the side and above the annular guide, with an agitator to be mounted on the annular guide under the fixed and movable guides.

3. In a sifter or strainer, the combination of an agitator comprising an annular frame having a handle attached thereto, a plurality of arms connected together and each arm having a crook that is connected to the frame, each crook having an upturned extremity, with a vessel to receive the agitator, a guide in the vessel for the agitator, and a foraminous bottom in the vessel under the guide.

4. In a sifter and strainer, the combination of a vessel comprising an annular apertured side, an internal annular guide connected to the lower portion of the side, a foraminous bottom connected to the side beneath the annular guide, a bottom ring attached to the side of the vessel, and an agitator comprising an annular frame mounted movably on the annular guide and provided with a guide extending from the frame against the side of the vessel to the top thereof to be guided thereby, and having an apertured handle, arms connected to the annular frame, a guide fixed to the side of the vessel above the annular guide, and a movable guide mounted on the exterior of the side of the vessel and extending through the aperture therein and above the annular guide.

5. In a sifter or strainer, the combination of a vessel with an inclined side and having an internal annular guide connected to the side, a foraminous bottom supported by the side under the annular guide, a fixed guide on the side of the vessel above the annular guide, a movable guide mounted on the side of the vessel above the annular guide, and an agitator comprising an annular frame mounted movably on the annular guide under the fixed and movable guides and provided with a relatively broad guide extending from the frame against the side of the vessel to the top thereof at the angle of the inclined side to be guided thereby and having an apertured handle thereon.

In testimony whereof, I affix my signature in presence of two witnesses.

JAMES C. BOWE.

Witnesses:
E. T. SILVIUS,
M. D. BEATY.